United States Patent [19]

Gowan

[11] 3,736,512

[45] May 29, 1973

[54] NON-INTERFERING ON-LINE COMMUNICATION RECEIVER TEST SYSTEM

[75] Inventor: Richard L. Gowan, Bonita, Calif.

[73] Assignee: The United States of America as represented by the Secretary of the Navy, Washington, D.C.

[22] Filed: Feb. 24, 1972

[21] Appl. No.: 228,978

[52] U.S. Cl. ..........325/363, 179/15 BS, 179/15 BF, 324/76 R, 325/67

[51] Int. Cl. ..........H04b 1/10

[58] Field of Search..........179/15 BF, 15 BS; 325/67, 363; 324/73, 76 R, 91; 178/18 J

[56] References Cited

UNITED STATES PATENTS 3,659,044 4/1972 Olson ..........325/363

*Primary Examiner*—Albert J. Mayer
*Attorney*—R. S. Sciascia, G. J. Rubens, J. W. McLaren and T. M. Phillips

[57] ABSTRACT

A locally generated signal of the same frequency to which a superheterodyne receiver is tuned, is injected by means of a two channel multiplexer into the front end of the receiver. The injected signal is time multiplexed with the incoming antenna signal so that the received signal, at any point in the receiver, can be compared to a locally generated standard, all without interfering with the incoming signal from the antenna.

9 Claims, 3 Drawing Figures

Patented May 29, 1973 3,736,512

2 Sheets-Sheet 1

NON-INTERFERING ON-LINE COMMUNICATION RECEIVER TEST SYSTEM

BACKGROUND OF THE INVENTION

In the field of automatic testing, communication receivers present a particularly difficult problem for several reasons. It is usually desired that the receiver remain in an active operational on-line status, so that the receiver is constantly ready for the receipt of vital incoming messages. In order that a communications receiver perform this function it is necessary to know that all of its operational parameters lie within acceptable limits of satisfactory performance. To make such a determination, in the present state of the art, the receiver must be periodically taken off-line so that known standard test signals may be injected into it for complete performance evaluation. This is ncessary because it is impossible to make amplifier gain measurements in the absence of known input signals. Normal incoming signals are not a satisfactory stimulus for such measurements since it is usually not possible to perdict the level of incoming signals for measurement purposes.

SUMMARY OF THE INVENTION

The present invention provides a testing system for communication receivers which allows active injection of automatically timed and precisely known test signals without interfering with the normal on-line operation of the receiver, so that its level of performance can be precisely determined by sensors built into the receiver. The outputs of these sensors may be sampled by centralized automatic test systems through appropriate data acquisition; or may be used to activate indicator readout devices built into the receiver for direct view by an operator. Then under adverse operating conditions, the operator is able to determine if the receiver has failed or if there is no signal being received because of the adverse operating condition which may include atmospheric disturbances. Also means are provided for obtaining a direct measurement of the frequency to which the receiver is tuned.

OBJECTS OF THE INVENTION

An object of the invention is to provide a means for testing the operating conditions of communication receivers.

Another object is to provide a means for testing communications receivers by the injection of automatically tuned and precisely known test signals without interfering with the normal on-line operation of the receiver.

A further object is the provision of a communications receiver testing system wherein the level of performance can be precisely determined by sensors built into the receiver for direct view by an operator or for activating remote indicating devices.

Still another object is the provision of a communication test system that generates a test signal having the same frequency as the frequency to which the receiver is tuned and providing means for directly measuring the frequency to which the receiver is tuned.

Other objects and many of the attendant advantages of this invention will be readily appreciated as the same becomes better understood by reference to the following detailed description when considered in connection with the accompanying drawings.

DESCRIPTION OF THE PREFERRED EMBODIMENT

Figure 1:
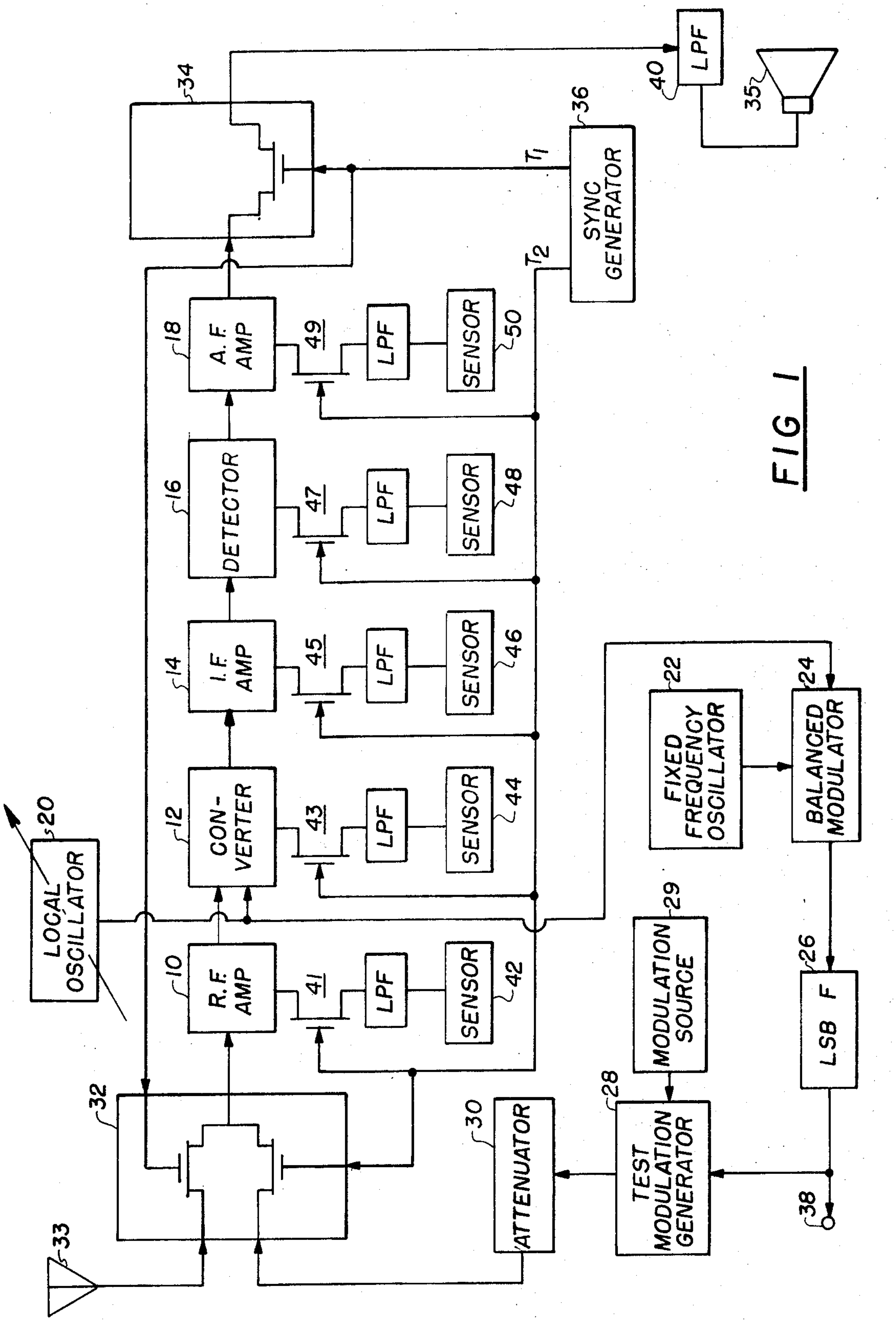
FIG. 1 is a block diagram of a preferred embodiment of the invention.

Referring now to the drawings wherein there is shown in FIG. 1 a conventional superheterodyne receiver having an RF amplifier 10, converter 12, IF amplifier 14, detector 16 and audio amplifier 18 and a tunable local oscillator 20. A test signal is generated by mixing the output of fixed frequency oscillator 22 in balanced modulator 24 with the output of local oscillator 20 and passing the lower sideband frequency by means of lower sideband bandpass filter 26 to modulator 28. A modulating signal from modulating source 29 is applied to modulator 28 for modulating the carrier signal out of filter 26 to produce a modulated signal compatible with the mode in which the receiver is operating. For amplitude modulation, source 27 could be a sine wave. The modulated output signal from modulator 28 is fed through attenuator 30 to one of the inputs of the two channel time division multiplexer 32. The output from the audio frequency amplifier 18 of the receiver is fed through output multiplexer 34 to a speaker 35. Switching of multiplexers 32 and 34 is accomplished by means of sync generator 36 which may be a conventional freerunning multivibrator. Multiplexer 32 includes two field effect transistors controlled by the sync voltages from sync generator 36. Output multiplexer 34 consists of a single field effect transistor controlled by the T1 voltage from sync generator 36.

IF amplifier 14 is tuned to a single fixed frequency and is used to provide most of the gain and selectivity of the receiver. Heterodyning or frequency conversion is accomplished in converter 12 to convert any received signal within the tuning band of the receiver to the IF frequency of the receiver. In normal operation, the receiver is tuned to a selected frequency for receiving communication signals. The action of tuning the receiver causes local oscillator 20 to generate a frequency higher than the tuned frequency such that when the local oscillator frequency is heterodyned with the incoming signal from antenna 33 in converter 12, the resultant difference frequency will equal the tuned frequency of IF amplifier 14.

By way of example assume that the tuning band of the receiver is 3 to 6 MHz, and that its IF frequency is 0.5MHz. If the receiver is tuned to 3 MHz, local oscillator 20 generates a frequency of 3.5MHz. As the output of local oscillator 20 is combined with the incoming signal in converter 12 the difference frequency is 3.5MHz − 3MHz = 0.5 MHz. The 0.5 MHz is the required IF frequency. In the case of balanced modulator 24, the 3.5 MHz output of local oscillator 20 is combined with the fixed output of 0.5 MHz from oscillator 20 and the difference frequency is available from the output of the lower side band filter 26. This difference frequency is 3.5 MHz − 0.5 MHz = 3MHz, which is the frequency to which the receiver is tuned.

As the receiver is tuned over its entire band the relationship between the outputs of oscillators 20 and 22 will remain constant so that the two frequencies fed into balanced modulator 24 will always cause the output frequency of filter 26 to be equal to the frequency to which the receiver is tuned. This output frequency is fed into the modulator 28 and is also available for measurement at test point 38. Modulator 28 provides a modulating signal that is compatible with the mode in which the receiver is being operated (for example, CW, AM, LSB, etc.) and is then attenuated in attenuator 30 to a level that is compatible with the dynamic range of the receiver RF amplifier 10.

Figure 2A:
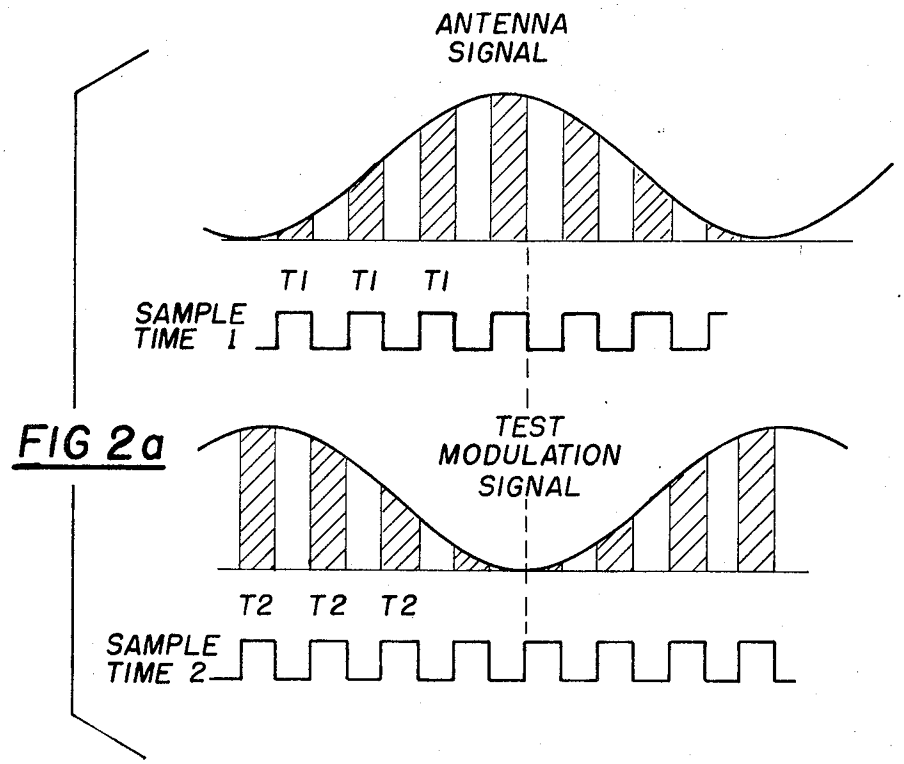
FIG. 2 are graphs of waveforms used in describing the operation of the embodiment of FIG. 1.
Figure 2B:
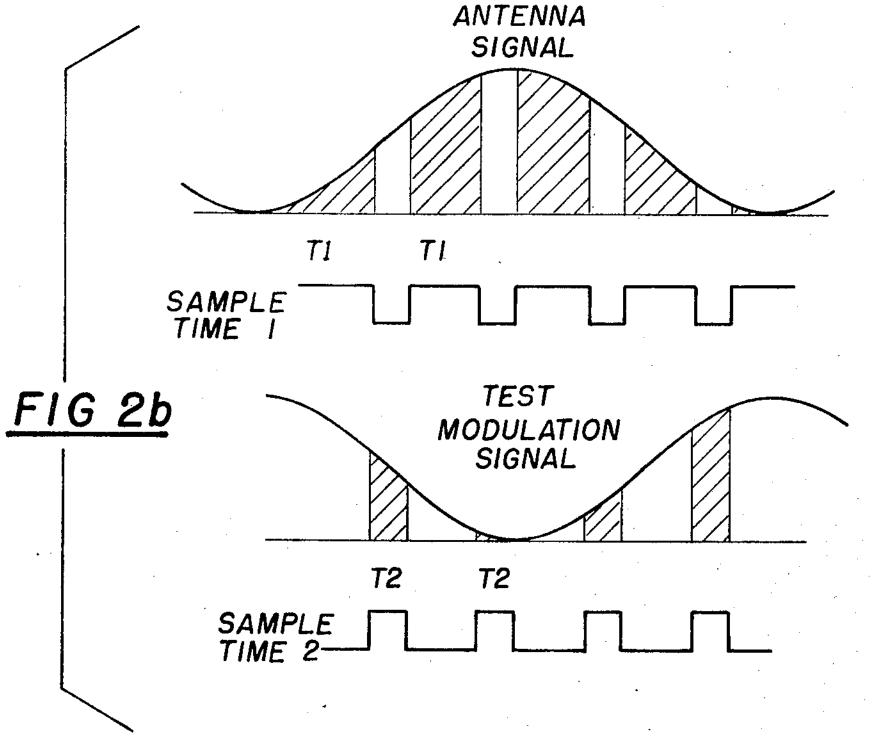

The output of attenuator 30 is fed as the input of one of the channels of two channel input multiplexer 32. The other input to the two channel multiplexer 32 is the signal from receiver antenna 33. Multiplexers 32 and 34 are cycled continuously by the two output signals from sync generator 36, so that the two inputs to multiplexer 32 are alternately fed to the superheterodyne receiver. As shown by the waveforms of FIG. 2, the signal fed from antenna 33 to the receiver is during sample times T1 and the output of attenuator 30 is fed to the receiver during sample times T2. When the receiver is tuned to a selected frequency, two modulated carriers of equal frequency will be present at the input terminals of the two channel input multiplezer 32, as explained. Since the carrier frequencies are equal to each other and equal to the tuned frequency of the receiver, each will be accepted by the RF amplifier 10 during its corresponding time-share time. It is known from sampling theory that if each input is sampled at a rate such that the sampling frequency is at least twice the highest frequency component of the modulating frequency, the signal can be exactly reconstructed from its samples by the use of a low pass filter. This function is accomplished by the low pass filter 40, since it is energized from the output of multiplexer 34 in sync with multiplexer 32. Output signals will then be fed to low pass filter 40 only when the received signal at antenna 33 is fed to RF amplifier 10. Since the receiver is time shared, during the T2 time the output signal from modulator 28 is fed to the receiver through attenuator 30. As shown in FIG. 1, low pass filter sensors 42, 44, 46, 48 and 50 are respectively coupled to amplifier 10, converter 12, IF amplifier 14 and detector 16 by means of data sampling switches 41, 43, 45, 47, and 49. All of the data sampling switches are synchronized to sample at times T2 by sync generator 36. The effect of this arrangement is that the low pass filter sensors are energized only during times T2 when a precisely known test signal has access to the receiver. Therefore since by the application of sampling theory again, the test signal are completely reconstructed from its T2 samples. The outputs of the low pass filter sensors will then reflect performance level of the various receiver components during the T2 sampling time. As shown in FIG. 2, timing diagram A indicates that sample time T1 and T2 are of equal duration; however this is not a necessary restriction for the operation of the multiplexing test signal generator. It may be found more desirable in certain applications to utilize sample times of unequal duration as indicated in timing diagram B.

Obviously many modifications and variations of the present invention are possible in the light of the above teachings. It is therefore to be understood that within the scope of the appended claims the invention may be practiced otherwise than as specifically described.

What is claimed is:

1. In a non-interfering on-line communication receiver test system, the combination comprising:

a. a communication receiver having a fixed IF frequency, a receiving antenna, an RF stage, an audio stage, a speaker and a tunable local oscillator, b. a fixed frequency oscillator operating at the IF frequency of said receiver, c. test signal generating means coupled to said fixed frequency and tunable oscillators for generating a test signal having the same frequency as the frequency to which the RF stage of said receiver is tuned, d. first switch circuit means coupled to the RF stage of said receiver, the test signal generating means and the receiving antenna for coupling said test signal and signals received at said antenna to said receiver, e. second switch circuit means coupled between said audio stage and said speaker.

f. switch signal generating means connected to said first and second switch circuit means for controlling the coupling of received signal and test signal alternately, for preventing interference with the normal operation of said receiver when said test signal is coupled to said receiver.

2. The test system of claim 1 wherein a test terminal is coupled to said test signal generating means for measuring the frequency of the incoming signal to the receiver.

3. The test system of claim 1 wherein means are coupled to said receiver for determining the operating condition of each stage of said receiver.

4. The test system of claim 1 wherein said test signal generating means includes a balanced modulator having a first input coupled to said tunable oscillator, a second input coupled to said fixed frequency oscillator and having an output, bandpass filter means coupled to the output of said balanced modulator for passing only signals of the same frequency to which the RF stage of said receiver is tuned, and a signal modulating circuit coupled to said filter means for modulating the signal passed by said filter to provide a test signal compatible with the mode in which said receiver is being operated.

5. The test system of claim 3 wherein said first swtich circuit means for coupling the test signal to the RF stage of said receiver comprises a two channel time division multiplexer.

6. The test system of claim 5 wherein said two channel time division multiplexer includes a first field effect transistor switch connected between a receiving antenna and the RF stage of said receiver, a second field effect transistor switch connected between the output of said test signal generating means and the RF stage of said receiver and switch signal generating means coupled to said first and second field effect transistors for supplying switching signals to cause said test signal and the signal from the antenna to be alternately coupled to the RF stage of said receiver.

7. The test system of claim 6 wherein said means for determining the operating condition of each stage of said receiver includes a sensor coupled through a low pass filter and field effect transistor switch to said stage, said field effect transistor switch being synchronized to conduct only when said second transistor switch of said multiplexer means is conducting.

8. The test system of claim 7 wherein said first and second switch circuit means and the switch means for coupling the test signal from each stage of the receiver to a sensor are all synchronized by being coupled to said switch signal generating means.

9. The test system of claim 8 wherein said switch generating means is a free running multivibrator having a firs output signal coupled to said first field effect transistor of said first switch circuit means and to said second switch circuit means, and a second output coupled to said second field effect transistor of said switch circuit means and to said field effect transistors coupling the outputs of each stage to its sensor.

* * * * *